No. 736,023. PATENTED AUG. 11, 1903.
W. L. ROSS & D. C. TOLLINGER.
MIXING FAUCET.
APPLICATION FILED APR. 15, 1903.
NO MODEL.
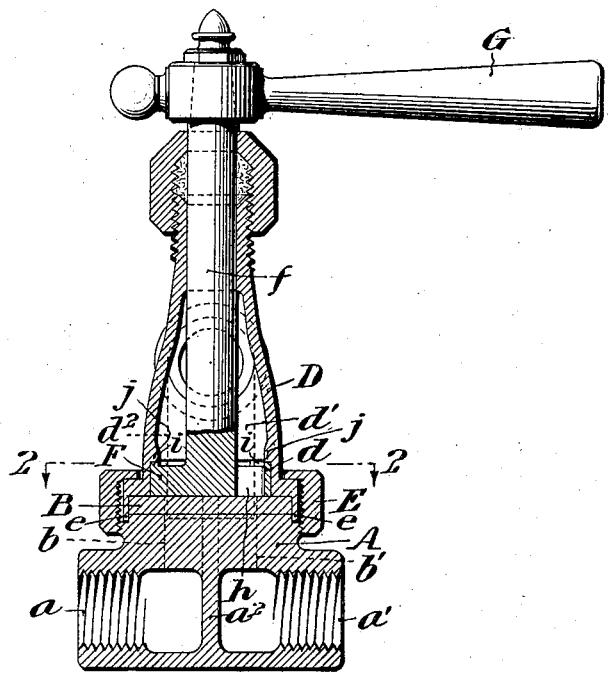
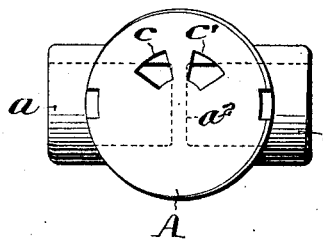
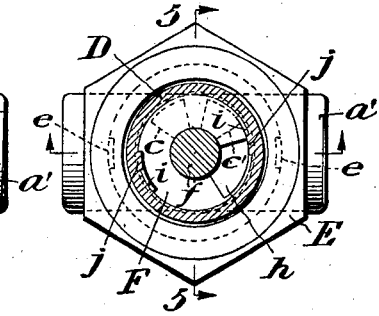
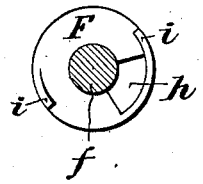
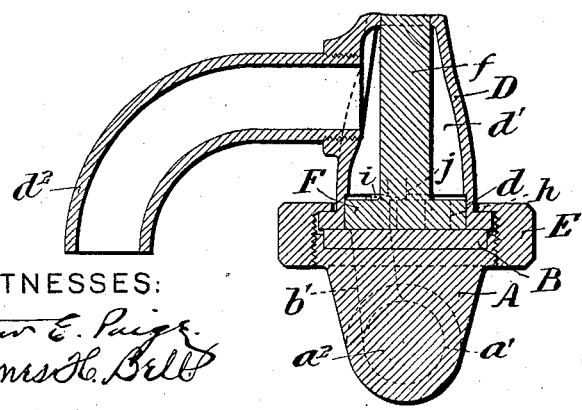
WITNESSES:
INVENTORS
William L. Ross
and David C. Tollinger
by their attorneys No. 736,023. Patented August 11, 1903.

UNITED STATES PATENT OFFICE.

WILLIAM L. ROSS AND DAVID C. TOLLINGER, OF PHILADELPHIA, PENNSYLVANIA.

MIXING-FAUCET.

SPECIFICATION forming part of Letters Patent No. 736,023, dated August 11, 1903.

Application filed April 15, 1903. Serial No. 152,651. (No model.)

*To all whom it may concern:*

Be it known that we, WILLIAM L. ROSS, a resident of No. 410 Gaskill street, and DAVID C. TOLLINGER, a resident of No. 1811 Tree street, in the city of Philadelphia, county of Philadelphia, and State of Pennsylvania, citizens of the United States, have invented certain new and useful Improvements in Mixing-Faucets, of which the following is a specification, reference being had to the accompanying drawings.

Our invention relates to a compound or mixing faucet by means of which two liquids may be discharged through a common aperture in any desired proportions or either one alone. As we have shown it in the drawings, it is designed by us and is especially applicable for the purpose of regulating the admission of hot and cold water to a bath or shower or for similar purposes. We accomplish this end by a rotary valve-disk with a single aperture revolving upon a double-apertured seat. By making the apertures both of the seat and the valve-disk in the shape of segments we are able to maintain a constant quantity of liquid passing through the valve, while at the same time varying the proportions of the two fluids at will.

In the accompanying drawings, Figure 1 is a vertical section through a faucet embodying our invention. Fig. 2 is a horizontal section taken along the line 2 2, Fig. 1. Fig. 3 is a view of the valve-seat as seen above. Fig. 4 is a detailed view of the valve-disk. Fig. 5 is a vertical section taken along the line 5 5, Fig. 2, at right angles to the section shown in Fig. 1.

A is the base member of the faucet. It contains two equal and opposite threaded openings $a\ a'$ for the admission of liquid, separated from each other by a partition $a^3$. On top of the base member is formed the circular valve-seat B. The opening $a$ leads by a channel $b$ to a segmental aperture $c$, formed in the seat, as seen in Fig. 3. Likewise the opening $a'$ leads by a channel $b'$ to a similar segmental aperture $c'$, formed in the seat, standing in juxtaposition to the aperture $c$.

D is the upper member of the faucet. It contains a valve-chamber $d$ and a mixing-chamber $d'$ and has a spout $d^2$ issuing from the mixing-chamber. The lower edge of this upper member D is circular and rests upon the valve-seat, being clamped thereto by the shouldered and threaded collar E. To prevent the possibility of rotation between these parts, two lugs $e\ e$ project down into corresponding holes in the valve-seat. Within the valve-chamber is the valve proper in the form of a rotating disk F, formed integrally with a valve-stem $f$, which projects up through the mixing-chamber $d'$ and out through the top of the faucet, where it terminates in the handle G. The rotary disk F fills the valve-chamber and rests closely upon the valve-seat. It is pierced by a single segmental aperture $h$. It has formed upon its upper surface near its periphery two shallow cam-inclines $i\ i$. In registration with these cam-inclines two projecting shoulders $j\ j$ are formed in the interior of the mixing-chamber. The segmental aperture $h$ in the valve-disk corresponds in radial position and in curvature to the segmental apertures $c\ c'$, formed in the valve-seat, but is somewhat wider. The relative position of these parts is such that when the handle G is turned so as to be directly over the spout $d^2$ the aperture $h$ in the valve-disk is central over the space between the apertures $c\ c'$ in the seat, with its edges equally overlapping each of said apertures. In this position it therefore admits to the mixing-chamber an equal quantity of both liquids, which may be supposed to be hot and cold water, entering, respectively, by way of $a$ and $a'$. By turning the handle, and thus rotating the valve from one side to the other, the proportion of hot or cold water admitted may be varied, and it will be noticed that, owing to the similarity of the segments and their relation to each other, an increase in the quantity of one liquid admitted is accompanied by precisely equal decrease in the quantity of the other liquid admitted, the combined area of the efficient portions of the apertures $c\ c'$ being always equal. This is true until the departure of the handle from the line of the spout becomes so great as to throw the valve-aperture $h$ sufficiently to one side to cause it to register with only one of the two apertures in the seat, thus admitting either hot or cold water without admixture of the other. A still further movement of the handle in the direction of the opening $a'$ throws the aperture $h$ far enough around to clear it entirely from the apertures $c'$ and shuts off the supply of water altogether. At the same time the cam-inclines $i\ i$ ride under the shoulders $j\ j$, which have been referred to, increasing the pressure between the valve and its seat, so as to insure complete tightness of the joint and absence of leakage. By varying the position of the cams $i\ i$ and the corresponding shoulders $j\ j$ the shutting off of all admission of water may be arranged to occur at either extremity of the throw of the handle; but, as shown in the drawings, the vertical sides of the cam-inclines $i\ i$ come into contact with the shoulders $j\ j$ and prevent further motion of the handle in the direction of the opening $a$, admitting hot water, before the valve-disk has been rotated so far as to admit hot water to the complete exclusion of cold. In this way the valve may be made "antiscalding."

Having thus described our invention, we claim—

1. In a mixing-faucet, the combination of a base member which supports a circular valve-seat, having two equal apertures each communicating by way of channels formed therein with different ingress-openings; a mixing-chamber fitted with a single discharge-opening; and a valve in the form of a disk rotating upon the valve-seat, interposed between the base member and the mixing-chamber; said rotary disk having but a single aperture capable of registering with either one or simultaneously with both of the apertures in the seat, substantially as described.

2. In a mixing-faucet, the combination of a mixing-chamber fitted with a discharge-spout; a valve in the form of a rotary disk, with a single segmental aperture controlling the entrance to the mixing-chamber; a valve-seat upon which said valve rests and rotates having two similar segmental apertures communicating with different liquid-ingress pipes, said segmental apertures in the valve-seat being similar and in proximity to each other; said valve-aperture being arranged to register with either one or simultaneously with both of the apertures in the seat, and being of such width that the effective diminution of one of the ingress-apertures of the valve-seat by the rotation of the valve is accompanied by precisely equal effective enlargement of the other aperture in the valve-seat, thereby maintaining constant the total quantity of liquid admitted into the mixing-chamber, irrespective of the proportions in which the liquid is admitted from the different ingress-pipes, substantially as described.

3. In a mixing-faucet, the combination of a base member having two equal and opposite ingress-openings separated by a transverse partition; a circular valve-seat on top of the base member having two equal apertures each communicating by separate channels with one of the ingress-openings; a rotary valve mounted on the valve-seat and having a single aperture capable of registering with either one or simultaneously with both of the apertures in the seat; and a mixing-chamber with a single discharge-orifice mounted on top of said valve-seat and valve, substantially as described.

4. In a mixing-faucet, the combination of a circular valve-seat having two equal ingress-apertures; a rotary valve-disk having a single aperture which when centrally turned with relation to the two apertures of the seat registers simultaneously with both, and which by its movement to one side or the other of this central position varies the proportion with which it registers with the said two apertures; a valve-chamber surrounding said rotary valve-disk having projecting shoulders on opposite sides thereof above the valve-disk; and cam-inclines formed on the upper surface of the valve-disk near its periphery, one on either side, and in contact with said projecting shoulders when the valve is rotated to closure, whereby leakage of the closed valve is prevented, substantially as described.

5. In a mixing-faucet, the combination of a circular valve-seat having two equal apertures; a rotary valve-disk having a single aperture which when centrally turned with relation to the two apertures of the seat registers simultaneously with both, and which by its movement to one side or the other of this central position varies the proportion with which it registers with the said two apertures; and a stop whereby in one direction further rotation of the valve-disk away from the central position is prevented before its aperture has wholly cleared the aperture on the farther side of the valve-seat, substantially as described.

6. In a mixing-faucet, the combination of the base member fitted with two opposite ingress-openings and with a circular valve-seat with apertures communicating with each of said openings; a second member containing valve-chamber and mixing-chamber and surrounding and surmounting the valve-seat on the base member; a rotary valve-disk having a single aperture rotating within the valve-chamber and in contact with the valve-seat; a central spindle connected with the valve-disk and passing up centrally through the mixing-chamber; and a discharge-orifice from the mixing-chamber, substantially as described.

7. In a mixing-faucet, the combination of the base member fitted with two ingress-openings, and with a circular valve-seat with an aperture communicating with each of said openings; a second member containing valve-chamber and mixing-chamber, surrounding and surmounting the valve-seat on the base member; a rotary valve-disk, having a single aperture, rotating within the valve-chamber and in contact with the valve-seat; a central spindle connected with the valve-disk and passing up centrally through the mixing-chamber; a discharge-orifice from the mixing-chamber; shoulders formed on the interior of said second member and projecting over the top of the valve on opposite sides of the periphery thereof; cam-inclines correspondingly formed upon the upper surface of the rotary valve-disk near its periphery; said shoulders and cam-inclines being so related circumferentially to the apertures of the valve-seat and valve-disk as to bind the valve to the valve-seat only at the time of complete closure, substantially as described.

In testimony whereof we have signed our names to this specification, this 8th day of April, 1903, in the presence of two subscribing witnesses.

WILLIAM L. ROSS.
DAVID C. TOLLINGER.

Witnesses:
JAMES H. BELL,
M. K. TRUMBORE.